US008058846B2

(12) United States Patent
Kim

(10) Patent No.: US 8,058,846 B2
(45) Date of Patent: Nov. 15, 2011

(54) PROTECTION CIRCUIT FOR A BATTERY PACK TO CONTROL THE OPERATION OF THE BATTERY PACK BASED ON TEMPERATURE

(75) Inventor: Youn-gu Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 599 days.

(21) Appl. No.: 12/230,105

(22) Filed: Aug. 22, 2008

(65) Prior Publication Data

US 2009/0085519 A1 Apr. 2, 2009

(30) Foreign Application Priority Data

Sep. 27, 2007 (KR) ........................ 10-2007-0097346

(51) Int. Cl.
*H02J 7/00* (2006.01)
(52) U.S. Cl. ...................................... 320/134; 320/150
(58) Field of Classification Search .................. 320/134
See application file for complete search history.

(56) References Cited

U.S. PATENT DOCUMENTS

| 6,714,882 B1* | 3/2004 | Iwaizono ..................... 702/63 |
| 2005/0237028 A1* | 10/2005 | Denning ..................... 320/134 |
| 2008/0018304 A1* | 1/2008 | Litingtun et al. ............. 320/134 |

FOREIGN PATENT DOCUMENTS

| CN | 1431746 A | 7/2003 |
| JP | 10-125360 | 5/1998 |
| JP | 2001-155783 | 6/2001 |
| JP | 2001-216883 | 8/2001 |
| JP | 2004120849 | 4/2004 |
| JP | 10-2006-0086804 | 8/2006 |
| JP | 2006-280150 | 10/2006 |
| KR | 10-2005-0055967 | 6/2005 |
| KR | 10-0508567 | 8/2005 |
| KR | 10-2006-0032838 | 4/2006 |
| KR | 10-0595637 | 6/2006 |
| KR | 10-0608709 | 7/2006 |

OTHER PUBLICATIONS

Chinese Office Action dated Nov. 12, 2010 corresponding to Chinese Patent Application No. 200810211412.4, together with Full English Translation.
Office action from the Korean Intellectual Property Office issued in Applicant's corresponding Korean Patent Application No. 10-2007-0097346 dated Mar. 25, 2009.
Korean Notice of Allowance issued on Sep. 21, 2009 in the corresponding Korean Patent Application No. 10-2007-0097346.
Chinese Office Action issued by SIPO, dated May 17, 2011, corresponding to Chinese Patent Application No. 200810211412.4, together with English full translation.

* cited by examiner

*Primary Examiner* — Arun Williams
(74) *Attorney, Agent, or Firm* — Robert E. Bushnell, Esq.

(57) ABSTRACT

A protection circuit controls charging/discharging of a battery pack in both a high temperature region and a low temperature region. The battery pack is protected from the risk of firing, burning or explosion which occurs in a high temperature region, to secure its safety. Furthermore, the charging and discharging of the battery pack is controlled in a low temperature region, to prevent incomplete charging and to increase the battery capacity efficiency.

18 Claims, 3 Drawing Sheets

PROTECTION CIRCUIT FOR A BATTERY PACK TO CONTROL THE OPERATION OF THE BATTERY PACK BASED ON TEMPERATURE

CLAIM OF PRIORITY

This application makes reference to, incorporates the same herein, and claims all benefits accruing under 35 U.S.C. §119 from an application for Protection Circuit of Battery Pack, Battery Pack Using the Same and its Operating Method earlier filed in the Korean Intellectual Property Office on the 27 of Sep. 2007 and there duly assigned Serial No. 10-2007-0097346.

BACKGROUND OF THE INVENTION

1. Field of the Invention

The present invention relates to a protection circuit for a battery pack, a battery pack including the protection circuit and a method of operating the battery pack, and more particularly, the present invention relates to a protection circuit for a battery pack, and a battery pack including the battery pack and a method of operating the battery pack which includes controlling electric-charge/electric-discharge in not only a high temperature region but also a low temperature region, so that electrical-charge/discharge operation is controlled at high and low temperatures and the efficiency and safety are secured.

2. Description of the Related Art

As portable terminals, such as notebook PCs, mobile phones and so on, have been rapidly developed to be small and light, batteries used as driving power sources of these terminals increasingly need to be small and to have a high capacity. Specifically, since a lithium secondary battery has an operating voltage of 3.6V or more, which is higher three times that of a nickel-cadmium battery or a nickel-hydrogen battery, and has a high energy density per unit weight, it has been rapidly expanded in use.

However, when a lithium secondary battery is charged to be 4.5V or more, an electrolyte in the battery is dissolved, so that a gas is generated. Then, the inside pressure of the battery increases by the gas, to leak the electrolyte. Moreover, when the battery is discharged to be under a predetermined voltage, copper as a negative collector starts melting within the electrolyte, to deteriorate the performance of the battery.

Moreover, in light of a chemical characteristic of a battery, there is a high risk of firing, bursting or blasting upon over-charging, over-discharging or over-current by a short between terminals.

Therefore, a secondary battery includes a protection circuit module, together with a bare cell. The bare cell is formed by arranging an electrode assembly formed of a positive plate, a negative plate and a separator in a can formed of an iron or aluminum material, finishing the can using a cap assembly, injecting an electrolyte into the can, and sealing the can.

The protection circuit module prevents accidents from occurring by over-charging, over-discharging or over-current, to secure safety and reliability. After the bare cell is formed, the protection circuit module is positioned outside of the bare cell and is electrically connected to the bare cell.

The protection circuit module includes a protection circuit device and an electrode terminal on one side of a printed circuit board on which a wiring pattern is formed, and an external connection terminal to be connected to a terminal for employing a secondary battery on the other side thereof. The printed circuit board and the bare cell are connected to each other by a positive lead plate and a negative lead plate which respectively connect a positive and a negative terminal of the printed circuit board to a positive and a negative terminal of the bare cell.

After a space between the bare cell and the protection circuit module is filled by resin when the bare cell and the protection circuit module are connected to each other, a secondary battery is labeled or included in an external case, to form a battery pack. A battery pack is arranged in a portable terminal for use.

In a conventional pack, a charging or discharging operation occurs when the battery is connected to an external power source device or load through an external port. A path between the battery and the external port is a high current path used as a charge/discharge path, through which a relatively high current flows.

When a power source device is connected to the external port, a charging operation occurs. Then, a charge path is connected from the external port, charge element, temperature fuse and fuse to the battery.

When a load is connected to the external port, a discharging operation occurs. Then, a discharge path is connected from the battery, fuse, temperature fuse, discharge element and the external port to the load.

That is, the charge/discharge element alternately operates the charge element or discharge element according to a charge or discharge mode.

The battery outputs its internal information to primary and secondary protection circuits. The internal information includes the cell-related information, such as the temperature of a cell, the charge potential of the cell and the strength of an electrical current flowing in the cell. A sensor resistance senses the occurrence of over-charging or over-discharging and over-current and transmits sensing information to the primary and secondary protection circuits.

The primary protection circuit controls the charge/discharge element according to the cell-related information provided from the battery and the sensing information provided from the sensor resistance. The secondary protection circuit controls whether to blow the fuse according to the cell-related information provided from the battery and the sensing information provided from the sensor resistance.

When the temperature of the charge/discharge element is sensed and is above a rated temperature, both ends of the temperature fuse are off, so that the charge/discharge element is prevented from firing, burning or blasting due to an abnormal phenomenon.

SUMMARY OF THE INVENTION

In a conventional battery pack having the aforementioned constitution, A meaàs has been provided for detecting abnormal operation in a high temperature region but there is no means for solving a problem occurring in a low temperature region.

Furthermore, the efficiency of discharge capacity of a battery cell is 95% at 60° C., 100% at 20° C., 80% at 0° C., 70% at −A and 40% at −20° C. Thus, the battery cell is likely to be directly damaged upon charging at a low temperature (below 0° C.) and is remarkably fast discharged since it operates with the efficiency of 40% to 80% upon operating at a lower temperature. Consequently, in the conventional battery cell, the efficiency of capacity of the battery significantly decreases and there is an inconvenience because the battery is not fully charged.

Therefore, the present invention is directed to provide a protection circuit for a battery pack, a battery pack having the protection circuit and a method of operating the battery pack, for controlling charging/discharging in not only a high temperature region but also a low temperature region, so that charging/discharging is controlled at high and low temperatures and the efficiency and safety are secured.

In one aspect of the present invention, a protection circuit of a battery pack includes: a charge/discharge element unit positioned in a high current path of a battery pack; a temperature sensor positioned at one side in the battery pack and sensing a temperature of a battery; and a primary protection circuit connected to the temperature sensor and the charge/discharge element and controlling the charge/discharge element depending on whether the temperature sensed by the temperature sensor is within the range of a reference operation temperature.

In another aspect of the present invention, a battery pack includes: a battery including one or more bare cells; a protection circuit electrically connected to the battery and including a charge/discharge element, a temperature sensor and a primary protection circuit for controlling the charge/discharge element, depending on whether a temperature of the battery sensed by the temperature sensor is within the range of a reference operation temperature; and an external terminal for electrically connecting the battery to an external power source or load.

In yet another aspect of the present invention, a method of operating a battery pack includes: sensing a temperature of a battery; determining whether a battery pack is charged or discharged; upon the battery pack being charged, comparing the sensed temperature to a predetermined reference operation temperature during charging and determining whether the sensed temperature is within the range of the reference operation temperature, and upon the battery pack being discharged, comparing the sensed temperature to a predetermined reference operation temperature during discharging and determining whether the sensed temperature is within the range of the reference operation temperature; upon the battery pack being charged and the sensed temperature being within the range of the reference operation temperature for charging, outputting a normal operation signal, upon the battery pack being charged and the sensed temperature not being within the range of the reference operation temperature for charging, outputting an abnormal operation signal, upon the battery pack being discharged and the sensed temperature being within the range of the reference operation temperature for discharging, outputting a normal operation signal, and upon the battery pack being discharged and the sensed temperature not being within the range of the reference operation temperature for discharging, outputting an abnormal operation signal; and turning on a charge element according to the normal operation signal during charging or turning off the charge element according to the abnormal operation signal during charging, and turning on a discharge element according to the normal operation signal during discharging or turning off the discharge element according to the abnormal operation signal during discharging.

Accordingly, a protection circuit of a battery pack and a battery pack having the protection circuit include a temperature sensor for measuring a temperature of a battery and controlling a charge/discharge element depending to the temperature sensed by the temperature sensor, so that the battery pack is protected from a risk of firing, burning or blasting which occurs when it operates in a high temperature region, to secure safety, and so that charging/discharging is controlled in a low temperature region, to prevent incomplete charging and to improve the capacity efficiency of the battery.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
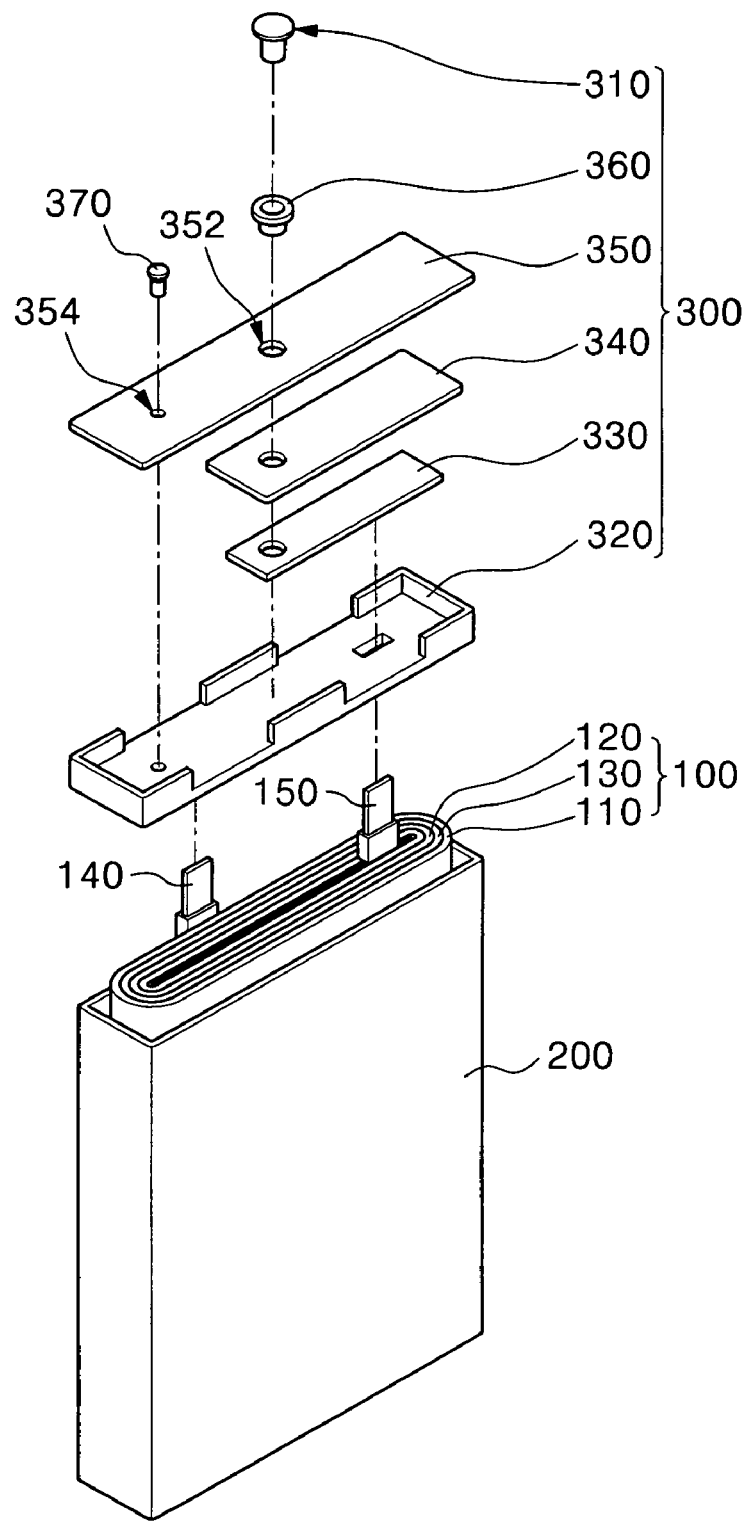
FIG. 1 is an exploded perspective view of a bare cell included in a battery pack according to an embodiment of the present invention.

FIG. 1 is an exploded perspective view of a bare cell included in a battery pack according to an embodiment of the present invention. In this embodiment, the bare cell has a square shape but the present invention is not limited to the same. Therefore, the bare cell may have a cylindrical shape or a pouch shape.

Further, when a battery pack is formed to be mounted onto a set, it is formed as a hard pack or an inner pack. Since the present invention is not limited to any one of these, it is applied to the hard pack and the inner pack.

Referring to FIG. 1, a bare cell includes an electrode assembly 100, a can 200 with an open top for receiving the electrode assembly 100 and an electrolyte, and a cap assembly 300 to close the can 200 and to be electrically connected to the electrode assembly 100.

The electrode assembly 100 is formed by stacking and winding a positive electrode plate 110, a negative electrode plate 120 and a separate 130. The positive electrode plate 110 is formed by coating a positive electrode collector with a positive active material and the negative electrode plate 120 is formed by coating a negative electrode collector with a negative active material. The separator 130 is interposed between the positive electrode plate 110 and the negative electrode plate 120, to prevent a short of the two electrode plates 110 and 120 and to enable movement of electrolytic ions.

One side of each of the positive electrode plate 110 and negative electrode plate 120 includes an uncoated part which is not coated with the positive and negative active material. The uncoated positive electrode and negative electrode parts are respectively connected to a positive electrode tab 140 and a negative electrode tab 150.

In FIG. 1, both the positive electrode tab 140 and the negative electrode tab 150 protrude above the can 200. However, the positive electrode tab 140 or the negative electrode tab 150 may protrude downward towards the can 200, to be electrically connected to the can 200.

The can 200 may be formed of a metal material, with the top being open. Preferably, light and flexible aluminum, stainless steel or the like may be used as the metal material, so that the can 200 is capable of performing a function of a terminal when it is in contact with the positive electrode tab 140 or the negative electrode tab 150.

The cap assembly 300 to be connected to the open top of the can 200 includes an electrode terminal 310, an insulating case 320, a terminal plate 330, an insulating plate 340, a cap plate 350, an insulating gasket 360, and a stopper 370 of an electrolyte injection hole.

The cap plate 350 is a metal plate having the size and shape corresponding to an opening of the top of the can 200. A terminal through-hole 352 of a predetermined size and an electrolyte injection hole 354 are formed in the cap plate 350. A safety vent (not shown) may be further formed in the cap plate 350.

The electrolyte injection hole 354 is to inject the electrolyte to smoothly move lithium ions into the can 200 receiving the electrode assembly 100. After the can 200 is closed by the cap assembly 300, the electrolyte is injected through the electrolyte injection hole 354, and the electrolyte injection hole 354 is closed by the stopper 370 thereof, so that the can 200 is closed.

The terminal through-hole 352 is to insert the electrode terminal 310. The electrode terminal 310 is electrically connected to the cap plate 330 through the terminal through-hole 352, and the insulating gasket 360 formed of rubber of high insulating properties or non-conductive materials is positioned on the outside of the electrode terminal 310, to insulate the electrode terminal 310 from the cap plate 350.

The insulating plate 340 and the terminal plate 330 are sequentially positioned under the cap plate 350. The terminal plate 330 is electrically connected to the negative electrode tab 150 of the electrode assembly 100, so that the electrode terminal 310 and the negative electrode tab 150 are electrically connected to each other. The insulating plate 340 electrically insulates the terminal plate 330 from the cap plate 350, so that no short occurs even though the cap plate 350 is electrically connected to the positive electrode tab 140 of the electrode assembly 100.

The insulating case 320 is positioned on the top of the electrode assembly 100, to fix the positive electrode tab 140 and the negative electrode tab 150 of the electrode assembly 100. The insulating case 320 may be formed of an insulating polymer resin, such as polypropylene (PP), polyphenylene sulfide (PPS), polyester sulfone (PES) or modified-polyphenylene oxide (PPO). To provide a space for holding the terminal plate 330 and the insulating plate 340, a support may be formed on an edge of the insulating case 320.

Figure 2:
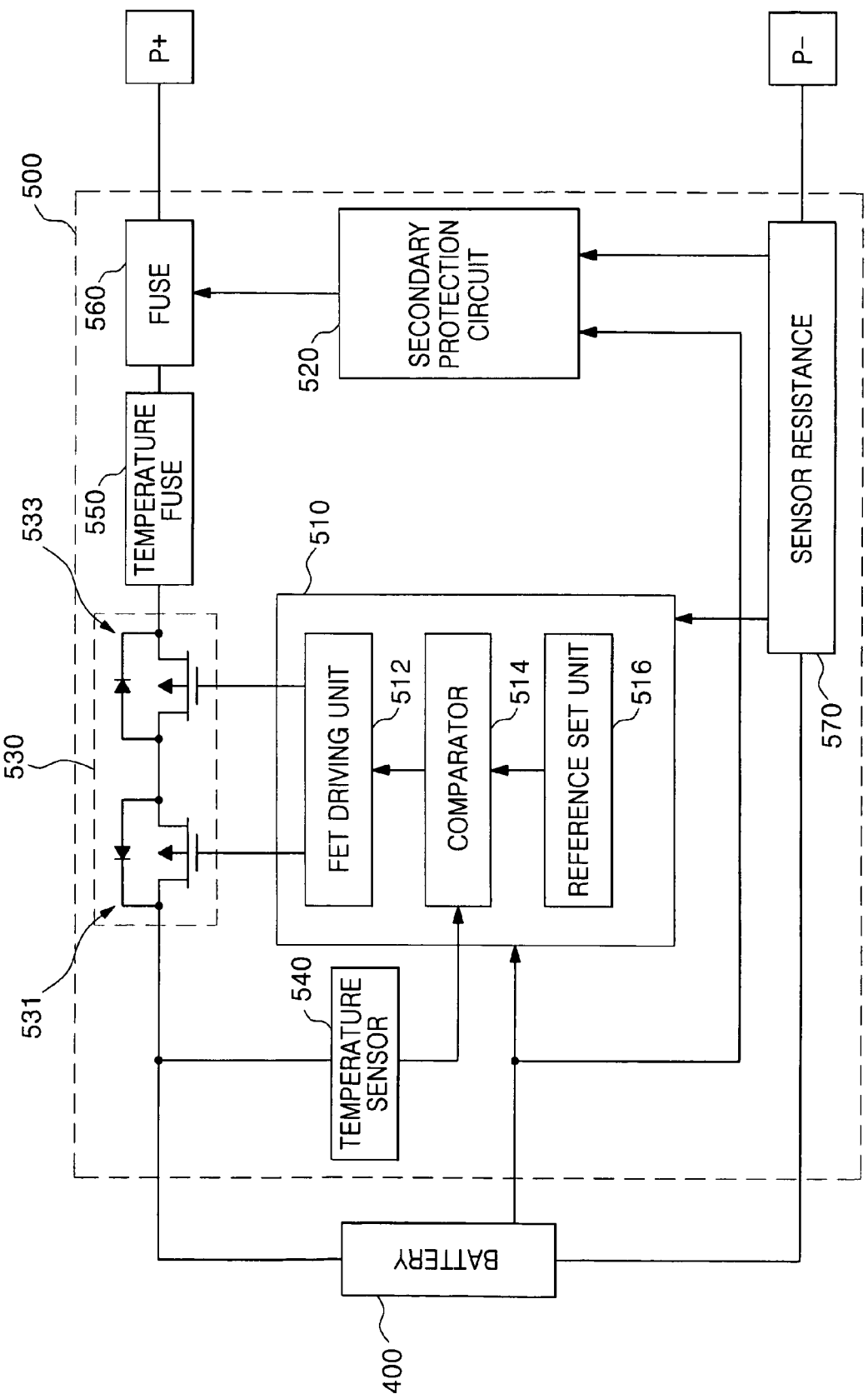
FIG. 2 is a block diagram of the battery pack according to an embodiment of the present invention.

FIG. 2 is a block diagram of the battery pack according to the embodiment of the present invention. The battery pack includes a battery 400, a protection circuit 500 and external terminals P+ and P− for electrically connecting the battery 400 to an external power source or a load.

The battery 400 may be formed of one or more bare cells capable of charging/discharging. As described with reference to FIG. 2, the bare cell may have a square shape, a cylindrical shape or a pouch shape. Furthermore, the bare cell outputs its internal information, that is, the cell-related information including the charge potential of the cell and the strength of an electrical current flowing in the cell, to primary and secondary protection circuits 510 and 520.

The external terminals P+ and P− are electrically connected to the battery 400 and are formed of a positive electrode P+ and a negative electrode P− to be connected to a positive electrode (not shown) and a negative electrode (not shown) of the battery 400. The external terminals P+ and P− facilitate charging or discharging of the battery 400 by connecting the battery 400 to the external power source device or load. More specifically, when the external power source device is connected to the external terminals P+ and P−, the battery 400 is charged, and when the load is connected to the external terminals P+ and P−, the battery 400 is discharged.

A protection circuit is formed by positioning an electrical element on a Printed Circuit Board (PCB) by spot welding or soldering. The protection circuit 500 of the present invention includes a primary protection circuit 510, a secondary protection circuit 520, a charge/discharge element 530, a temperature sensor 540, a temperature fuse 550, a fuse 560, and a sensor resistance 570.

The primary protection circuit 510 may further include other constituents in addition to an FET driving unit 512, a comparator 514, and a reference set unit 516 illustrated in FIG. 2. When the primary protection circuit includes the constituents 512, 514 and 516 to explain the idea of the present invention, irrespective of the other additional constituents, it is regarded as being within the scope of the present invention.

The primary protection circuit 510 receives signals from the battery 400 and the sensor resistance 570. When an over-discharge, under-charge or over-current occurs, the primary protection circuit 510 controls the charge/discharge element 530, to interrupt a flow of electricity so that charging or discharging is not performed.

Furthermore, the primary protection circuit 510 receives the temperature of the battery 400 measured from the temperature sensor 540 positioned nearby the battery 400, confirms whether the temperature is normal through the comparator 514 comparing the measured temperature to a temperature set by the reference set unit 516, and controls the charge/discharge element 530 by driving the FET driving unit 512 accordingly.

That is, when the temperature measured by the temperature sensor 540 is compared to a reference operation temperature set by the reference set unit 516 and as a result, it is within the range of the reference operation temperature of the battery 400, the primary protection circuit 510 controls the charge/discharge element 530 to normally perform a charging/discharging operation. However, when the measure temperature is not within the range of the reference operation temperature, the primary protection circuit 510 controls the charge/discharge element unit 530 not to perform the charging/discharging operation.

The FET driving unit 512 is connected to a discharge element 531 and a charge element 533 of the charge/discharge element 530. The FET driving unit 512 receives the information on whether the temperature is normal, which is determined by the comparator 514 and controls the charge element 533, to control the charge operation upon charge, and controls the discharge element 531, to control the discharge operation upon discharge.

The comparator 514 is connected to the temperature sensor 540 and the reference set unit 516. Comparing the temperature of the battery 400 received from the temperature sensor 540 to the reference operation temperature received from the reference set unit 516, the comparator 514 outputs a normal operation signal or an abnormal operation signal as the result of comparison to the FET driving unit 512.

The reference set unit 516 sets the reference operation temperature of the battery 400 and outputs the reference operation temperature to the comparator 514. The reference operation temperature of the battery 400 set by the reference set unit 516 may be set variously, depending on the application of the battery. Preferably, the reference operation temperature may be set as 0° C. to 45° C. upon charging and −20° C. to 60° C. upon discharging but it is not limited to these temperatures. It is possible to variously set a temperature by controlling the reference set unit 516.

Accordingly, since the primary protection circuit 510 is capable of controlling the charge/discharge element 530 based on the signal being input from the temperature sensor 540 as well as the signals being input from the battery 400 and the sensor resistance 570, it is capable of controlling the charge/discharge element 530 at a high temperature and a low temperature, depending on the temperature being set by the reference set unit 516. Consequently, it prevents not only the abnormal operation in a high temperature region but also the damage of the cell in a low temperature region and the deterioration of the efficiency.

Furthermore, since the primary protection circuit 510 is capable of controlling not a one-time element, such as a fuse, that cannot be again used when it is broken, but the charge/discharge element 530, it prevents the battery pack from being not used due to a temporary rise in temperature.

However, when a high current flows in the battery pack due to a short or due to other reasons, the flow of electricity needs to be quickly interrupted to halt a rapid temperature rise, or the battery pack having a temporary risk needs to be abandoned, the primary protection circuit 510 may be formed to intentionally control the one-time element, such as a fuse, so that the battery pack is disconnected.

The secondary protection circuit 520 operates in response to the signals being input from the battery 400 and the sensor resistance 570. When an abnormal operation, such as an over-current, occurs, the secondary protection circuit 520 interrupts the flow of electricity by blowing the fuse 560 positioned in the high current path between the battery 400 and the external terminal P+ or the battery 400 and the external terminal P−, to prevent the battery pack from firing, burning or blasting.

The charge/discharge element 530 includes the discharge element 531 and the charge element 533. The discharge element 531 and the charge element 533 are connected to the FET driving unit 512 of the primary protection circuit 510. The discharge element 531 is turned on during a discharge and the charge element 533 is turned on during a charge, according to the signal of the FET driving unit 512, to perform the charging and discharging operation.

Furthermore, when an abnormal operation, such as an over-discharge, an over-charge, an over-current or the like, occurs, the charge/discharge elements 531 and 533 are turned off by the control signal of the FET driving unit 512, to halt the charge and discharge operation.

The discharge element 531 and the charge element 533 are formed of MOS Field Effect Transistors (MOSFETs), and may be N-type MOSFETs or P-type MOSFETs.

One end of the temperature sensor 540 is connected to the battery 400 and the other end thereof is connected to the comparator 514 of the primary protection circuit 510, to sense the temperature of the battery 400 and to transfer the sensed temperature to the comparator 514. The temperature sensor 540 uses an element that converts a change of the surrounding temperature to a change of electrical resistance, a voltage or a current, and may use a positive characteristic thermistor or a negative characteristic thermistor.

The temperature fuse 550 is positioned to be close to the charge/discharge element 530. When the charge/discharge element 530 is over-heated so that the temperature rises, the temperature fuse 550 interrupts the flow of electricity by sensing the temperature of the charge/discharge element 530, to prevent the charge/discharge element 530 from being damaged by the over-heating and thus to secure the safety of the battery pack.

The fuse 560 is positioned between the charge/discharge element 530 and the external terminal P+. When an over-charge, an over-discharge or an over-current due to an external short occurs, the fuse 560 is forcibly melted to open the circuit, to interrupt the flow of electricity. The fuse 560 is connected to the secondary protection circuit 520 and operates according to the control signal of the secondary protection circuit 520. The fuse 560 may be a Self Control Protector (SCP).

Preferably, the fuse 560 may melt and be blown within the range of 110° C. to 130° C., considering that the temperature used for a process of manufacturing a general battery pack is under 110° C., and when the temperature inside the battery pack is excess of 130° C., it may generate heat or explode due to a swelling phenomenon.

The sensor resistance 570 is positioned between the battery 400 and the external terminal P− and is connected to the primary protection circuit 510 and the secondary protection circuit 520, to sense a current flowing in the high current path and to supply the current to the first protection circuit 510 and the secondary protection circuit 520.

Furthermore, since a resistance value of the sensor resistance 570 is known, when a voltage supplied to the sensor resistance 570 is sensed, not only the charge/discharge voltage of the battery 400 but also the charge/discharge current and an external short are indirectly sensed.

Figure 3:
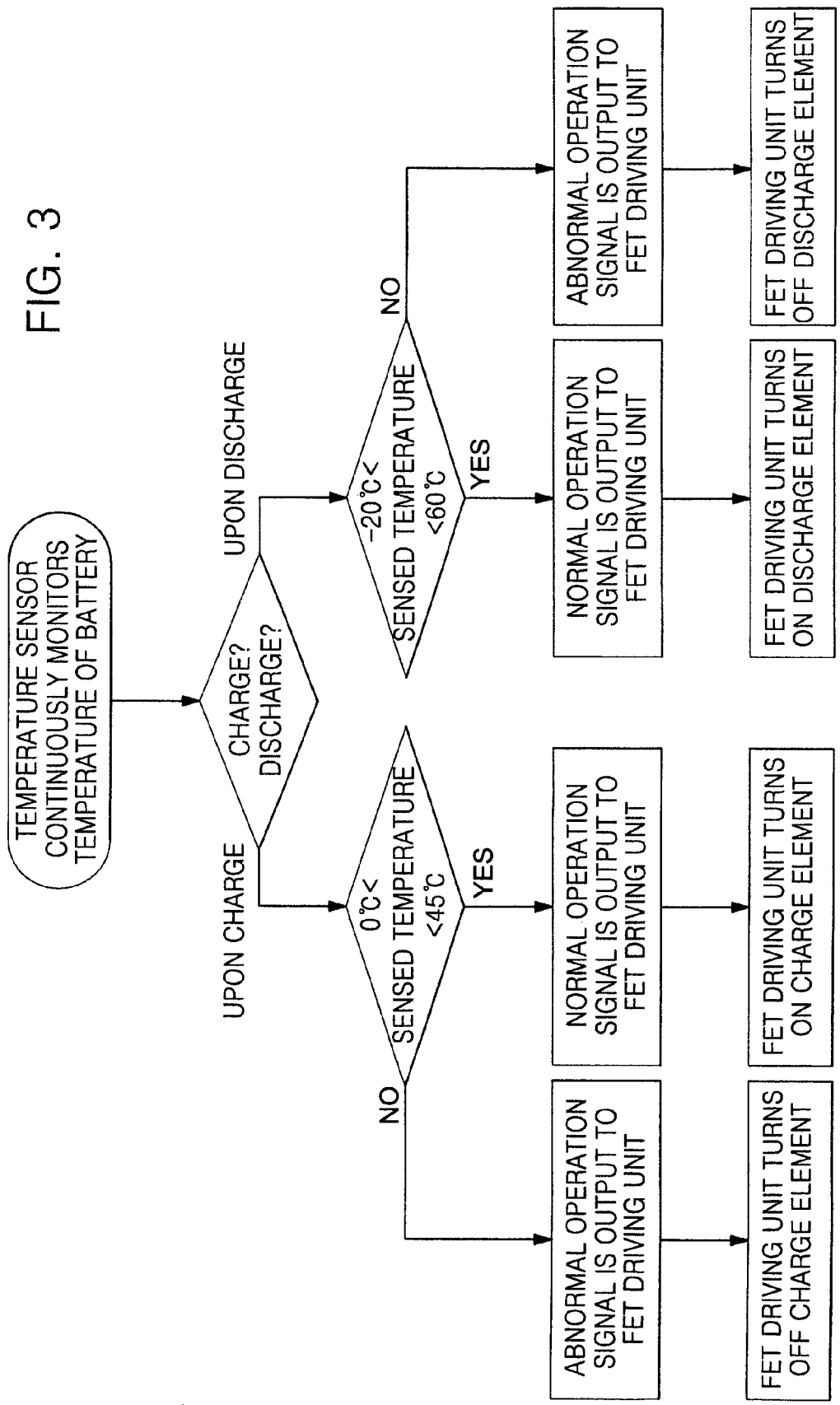
FIG. 3 is a flowchart for explaining a method of operating the battery pack according to an embodiment of the present invention.

A method of operating the battery pack according to the embodiment of the present invention is described below with reference to FIG. 3.

The temperature sensor 540 continuously senses the temperature of the battery 400 and transmits the sensed temperature to the comparator 514. The comparator 514 compares the sensed temperature to the reference operation temperature supplied by the reference set unit 516.

When the battery is charged and the sensed temperature is within the range of 0° C. to 45° C. which is a charge reference operation temperature, the comparator 514 outputs the normal operation signal to the FET driving unit 512, and the FET driving unit 512 turns on the charge element 533 in response to the normal operation signal, so that charging is performed. When the sensed temperature is not within the range of 0° C. to 45° C., which is the charge reference operation temperature, the comparator 514 outputs the abnormal operation signal to the FET driving unit 512, and the FET driving unit 512 turns off the charge element 533 in response to the abnormal operation signal, so that charging is not performed.

Furthermore, when the battery is discharged and the sensed temperature is within the range of −20° C. to 60° C., which is a discharge reference operation temperature, the comparator 514 outputs the normal operation signal to the FET driving unit 512, and the FET driving unit 512 turns on the discharge element 531 in response to the normal operation signal, so that discharging is performed. When the sensed temperature is not within the range of −20° C. to 60° C., which is the discharge reference operation temperature, the comparator 514 outputs the abnormal operation signal to the FET driving unit 512, and the FET driving unit 512 turns off the discharge element 531 in response to the abnormal operation signal, so that discharging is not performed.

Accordingly, since the protection circuit of a battery pack, and the battery pack having the protection circuit according to the embodiment of the present invention includes a temperature sensor for measuring the temperature of the battery including one or more bare cells and controls the charge/discharge element based on the temperature sensed by the temperature sensor. The battery pack avoids the risk of firing, burning or blasting when it operates in the high temperature region and thus its safety is secured. Furthermore, since the battery pack is capable of controlling the charge/discharge so as not to be performed in a low temperature region, it solves the problem in that charging is not fully performed and increases the efficiency of the battery capacity.

What is claimed is:

1. A protection circuit of a battery pack, comprising:
   a charge/discharge element unit positioned in a high current path of the battery pack;
   a temperature sensor positioned at one side in the battery pack, for sensing a temperature of a battery; and
   a primary protection circuit connected to the temperature sensor and the charge/discharge element unit, for controlling the charge/discharge element unit based on whether the temperature sensed by the temperature sensor is within the range of a reference operation temperature,
   wherein the primary circuit stops discharge of the battery pack when the temperature sensor detects a temperature below −20° C.

2. The protection circuit according to claim 1, wherein the primary protection circuit comprises:
   a reference set unit for outputting the reference operation temperature upon charging and discharging;
   a comparator connected to the temperature sensor and the reference set unit, for comparing the reference operation temperature to the temperature sensed by the temperature sensor and outputting an abnormal operation signal or a normal operation signal; and
   a FET driving unit connected to the comparator and the charge/discharge element unit, for controlling the charge/discharge element unit in response to the abnormal operation signal or the normal operation signal.

3. The protection circuit according to claim 1, wherein the charge/discharge element unit comprises a charge element and a discharge element.

4. The protection circuit according to claim 3, wherein the charge element and the discharge element are MOS field effect transistors.

5. The protection circuit according to claim 1, wherein the temperature sensor is an element for converting a change of a surrounding temperature to a change of an electric resistance, voltage or current.

6. The protection circuit according to claim 2, wherein the reference operation temperature during a charge is 0° C. to 45° C. and the reference operation temperature during a discharge is −20° C. to 60° C.

7. A battery pack comprising:
   a battery including one or more bare cells;
   a protection circuit electrically connected to the battery and including a charge/discharge element, a temperature sensor and a primary protection circuit for controlling the charge/discharge element based on whether a temperature of the battery sensed by the temperature sensor is within the range of a reference operating temperature; and
   an external terminal for electrically connecting the battery to an external power source or a load,
   wherein the protection circuit stops discharge of the battery pack when the temperature sensor detects a temperature below −20° C.

8. The battery pack according to claim 7, wherein the bare cell is in a square, cylindrical or pouch shape.

9. The battery pack according to claim 7, wherein the primary protection circuit comprises:
   a reference set unit for outputting the reference operation temperature during charging and discharging;
   a comparator connected to the temperature sensor and the reference set unit, for comparing the reference operation temperature to the temperature sensed by the temperature sensor and outputting either an abnormal operation signal or a normal operation signal; and
   a FET driving unit connected to the comparator and the charge/discharge element, for controlling the charge/discharge element in response to the abnormal operation signal or the normal operation signal.

10. The battery pack according to claim 7, wherein the charge/discharge element unit comprises a charge element and a discharge element.

11. The battery pack according to claim 10, wherein the charge element and the discharge element are Metal Oxide Semiconductor Field Effect Transistors (MOSFETs).

12. The battery pack according to claim 7, wherein the protection circuit further comprises:
    a temperature fuse connected to the charge/discharge element, for sensing a temperature and interrupting a flow of electricity when the charge/discharge element is overheated;
    a sensor resistance positioned between the battery and the external terminal and connected to the primary protection circuit and secondary protection circuit, for sensing a current flowing in a high current path and for supplying the current to the primary protection circuit and secondary protection circuit; and
    a secondary protection circuit for controlling the fuse based on a signal supplied from the battery and the sensor resistance.

13. The battery pack according to claim 7, wherein the primary protection circuit controls the charge/discharge element based on the signal from the battery and the sensor resistance.

14. The battery pack according to claim 7, wherein the temperature sensor is an element for converting a change of a surrounding temperature to a change of an electrical resistance, voltage or current.

15. The battery pack according to claim 14, wherein the temperature sensor is either a positive characteristic thermistor or a negative characteristic thermistor.

16. The battery pack according to claim 9, wherein the reference operation temperature during charging is 0° C. to 45° C. and wherein the reference operation temperature during discharging is −20° C. to 60° C.

17. A method of operating a battery pack, the method comprising:
    sensing a temperature of a battery;
    determining whether a battery pack is charged or discharged;
    comparing the sensed temperature to a predetermined charge reference operation temperature, and determining whether the sensed temperature is within the range of the reference operation temperature upon the battery pack being charged, and comparing the sensed temperature to a predetermined discharge reference operation temperature, and determining whether the sensed temperature is within the range of the reference operation temperature upon the battery pack being discharged;
    outputting a normal operation signal upon the sensed temperature being within the charge reference operation temperature and outputting an abnormal operation signal upon the sensed temperature not being within the charge reference operation temperature upon the battery pack being charged, and outputting a normal operation signal upon the sensed temperature being within the discharge reference operation temperature and outputting an abnormal operation signal upon the sensed temperature not being within the discharge reference operation temperature upon the battery pack being discharged; and turning on a charge element based on the normal operation signal or turning off the charge element based on the abnormal operation signal during charging, and turning on a discharge element based on the normal operation signal or turning off the discharge element based on the abnormal operation signal during discharging, wherein the discharge element is turned off when the sensed temperature is below −20° C.

18. The method according to claim 17, wherein the reference operation temperature during charging is 0° C. to 45° C. and the reference operation temperature during discharging is −20° C. to 60° C.

* * * * *